US010621137B2

(12) United States Patent
Chavez et al.

(10) Patent No.: US 10,621,137 B2
(45) Date of Patent: Apr. 14, 2020

(54) ARCHITECTURE FOR PREDICTING NETWORK ACCESS PROBABILITY OF DATA FILES ACCESSIBLE OVER A COMPUTER NETWORK

(71) Applicant: SHUTTERSTOCK, INC., New York, NY (US)

(72) Inventors: Alexander Chavez, Hoboken, NJ (US); David Chester, Brooklyn, NY (US); Heath Hohwald, Logrono (ES); Nathan Hurst, Seattle, WA (US); Kevin Scott Lester, Summit, NJ (US); Manor Lev-Tov, Brooklyn, NY (US)

(73) Assignee: Shutterstock, Inc., New York, NY (US)

( * ) Notice: Subject to any disclaimer, the term of this patent is extended or adjusted under 35 U.S.C. 154(b) by 967 days.

(21) Appl. No.: 15/091,273

(22) Filed: Apr. 5, 2016

(65) Prior Publication Data

US 2017/0286979 A1    Oct. 5, 2017

(51) Int. Cl.
| | | |
|---|---|---|
| G06F 15/00 | (2006.01) | |
| G06F 15/16 | (2006.01) | |
| G06Q 30/02 | (2012.01) | |
| G06F 16/28 | (2019.01) | |
| G06N 7/06 | (2006.01) | |
| H04N 7/16 | (2011.01) | |
| G06F 16/435 | (2019.01) | |
| H04L 29/06 | (2006.01) | |
| G06Q 20/04 | (2012.01) | |

(52) U.S. Cl.
CPC ............ G06F 15/16 (2013.01); G06F 16/288 (2019.01); G06F 16/435 (2019.01); G06N 7/06 (2013.01); G06Q 20/04 (2013.01); G06Q 30/0202 (2013.01); H04L 29/06 (2013.01); H04N 7/16 (2013.01)

(58) Field of Classification Search
None
See application file for complete search history.

(56) References Cited

U.S. PATENT DOCUMENTS

| | | | | |
|---|---|---|---|---|
| 6,064,385 A | * | 5/2000 | Sturgeon | ............... G11B 19/022 715/841 |
| 6,230,205 B1 | * | 5/2001 | Garrity | ................... H04L 29/06 709/204 |
| 7,512,236 B1 | * | 3/2009 | Zhu | ....................... G06Q 20/027 380/255 |

(Continued)

*Primary Examiner* — Gurkanwaljit Singh
(74) *Attorney, Agent, or Firm* — McDermott Will & Emery LLP

(57) ABSTRACT

Methods for predicting network access probability of data files accessible over a computer network are provided. In one aspect, a method includes generating a primary data vector for a media file based on a stored data representation of the file, and providing the data vector for the file to an algorithm that uses past interaction information for at least one other media file from a collection of media files having a degree of similarity with the media file above a threshold similarity value. The method also includes receiving, as an output of the algorithm, a marketability score for the media file, the score indicative of a likelihood that a user will download the media file. Systems and machine-readable media are also provided.

5 Claims, 7 Drawing Sheets

(56) References Cited

U.S. PATENT DOCUMENTS

| | | | | |
|---|---|---|---|---|
| 7,512,550 B2* | 3/2009 | Soga | ............... | G06Q 20/02 |
| | | | | 705/26.35 |
| 8,549,150 B1* | 10/2013 | Roseman | ........... | H04N 21/2181 |
| | | | | 370/351 |
| 9,106,953 B2* | 8/2015 | McMillan | ........ | H04N 21/44213 |
| 9,549,044 B1* | 1/2017 | Bell | ........ | H04L 67/327 |
| 2001/0007991 A1* | 7/2001 | Tobin | ................. | G06Q 20/102 |
| | | | | 709/203 |
| 2002/0023010 A1* | 2/2002 | Rittmaster | ........... | G06F 16/9537 |
| | | | | 705/26.1 |
| 2002/0035605 A1* | 3/2002 | McDowell | .............. | H04L 29/06 |
| | | | | 709/206 |
| 2002/0052225 A1* | 5/2002 | Davis | ................ | H04M 1/72566 |
| | | | | 455/567 |
| 2002/0120741 A1* | 8/2002 | Webb | ................. | G06F 11/3093 |
| | | | | 709/225 |
| 2003/0032409 A1* | 2/2003 | Hutcheson | ............ | G06Q 30/02 |
| | | | | 455/414.1 |
| 2003/0110138 A1* | 6/2003 | Van Do | ................ | G06Q 10/087 |
| | | | | 705/75 |
| 2003/0126076 A1* | 7/2003 | Kwok | .................... | G06Q 20/04 |
| | | | | 705/40 |
| 2003/0231604 A1* | 12/2003 | Liu | ........................ | G06Q 30/06 |
| | | | | 370/313 |
| 2003/0233266 A1* | 12/2003 | Liu | ........................ | G06Q 10/06 |
| | | | | 705/7.26 |
| 2003/0233285 A1* | 12/2003 | Liu | ..................... | G06Q 10/083 |
| | | | | 705/330 |
| 2003/0236694 A1* | 12/2003 | Liu | ........................ | G06Q 10/06 |
| | | | | 705/7.12 |
| 2004/0128308 A1* | 7/2004 | Obrador | ............... | G11B 27/031 |
| 2005/0044006 A1* | 2/2005 | Soga | ...................... | G06Q 20/02 |
| | | | | 705/26.35 |
| 2005/0071179 A1* | 3/2005 | Peters | .................. | G06Q 20/102 |
| | | | | 705/26.1 |
| 2005/0131837 A1* | 6/2005 | Sanctis | .................. | G06Q 20/12 |
| | | | | 705/64 |
| 2005/0202385 A1* | 9/2005 | Coward | ........... | H04L 29/06027 |
| | | | | 434/307 R |
| 2005/0246282 A1* | 11/2005 | Naslund | .............. | H04L 63/0428 |
| | | | | 705/52 |
| 2006/0123010 A1* | 6/2006 | Landry | .................... | G06F 16/25 |
| 2006/0167784 A1* | 7/2006 | Hoffberg | ................ | G06Q 20/401 |
| | | | | 705/37 |
| 2006/0230415 A1* | 10/2006 | Roeding | ................. | H04N 7/173 |
| | | | | 725/34 |
| 2006/0288395 A1* | 12/2006 | DiLorenzo | ............. | H04H 20/28 |
| | | | | 725/113 |
| 2007/0204321 A1* | 8/2007 | Shen | .................. | H04N 7/17318 |
| | | | | 725/135 |
| 2007/0224979 A1* | 9/2007 | O'Neal | ................. | G06Q 30/02 |
| | | | | 455/417 |
| 2008/0270417 A1* | 10/2008 | Roker | .................... | G06Q 30/02 |
| 2008/0306909 A1* | 12/2008 | Bernard | ............... | G11B 27/105 |
| 2009/0083228 A1* | 3/2009 | Shatz | ................. | G06K 9/00711 |
| 2009/0083812 A1* | 3/2009 | Tang | .................. | H04N 7/17318 |
| | | | | 725/93 |
| 2013/0031211 A1* | 1/2013 | Johnson | ........... | H04N 21/23103 |
| | | | | 709/218 |
| 2013/0080968 A1* | 3/2013 | Hanson | ................. | G06F 3/0482 |
| | | | | 715/783 |
| 2014/0150001 A1* | 5/2014 | McMillan | ........ | H04N 21/44213 |
| | | | | 725/9 |
| 2015/0074022 A1* | 3/2015 | Cornelius | ............. | G06F 16/435 |
| | | | | 706/12 |

* cited by examiner

ARCHITECTURE FOR PREDICTING NETWORK ACCESS PROBABILITY OF DATA FILES ACCESSIBLE OVER A COMPUTER NETWORK

BACKGROUND

Field

The present disclosure generally relates to generating vector data for stored data files accessible over a network to generate values indicative of mathematical probabilities based on prior access to the stored data files over the network.

Description of the Related Art

Network accessible data file repositories for content commonly provide users with the ability to access search algorithms for searching and accessing data files for content in the data file repositories. For example, for a network accessible media content repository with a large volume of data files, such as for images and videos, a user that seeks to search for media related to cats may enter the search query "cats" into a search interface for the online image content repository. Media associated with the keyword "cat" or "cats" may then be returned as responsive to the search query. There are often, however, a large number of files that are valid results for a common query such as "cats". Behavioral data indicating which of these files is most responsive to the search query "cats" is commonly used when identifying and providing media files responsive to the search query.

SUMMARY

Identifying media files from a collection of media files that are responsive to a search query without behavioral data (e.g., information indicative of past user interactions with media files) related to the search query is difficult. Furthermore, even if behavioral data is available for media files and/or the search query, there is a problem that new media files added to the collection are often not identified as responsive to a search query as compared to existing media files that, based on behavioral data, are deemed responsive to the search query, even if the new media files are of similar or better quality that the existing media files. The purpose of the disclosed technology is to take advantage of both the existing behavioral data and information about a media file (e.g., pixel information) to predict a likelihood that a user will interact (e.g., download, purchase, etc.) with another media file. The ability to predict how likely a user is to interact with a media file is of benefit to potential content creators (e.g., users who create media files, such as photographers or videographers) because such content creators, when provided with such prediction information, can more informatively generate or prioritize their submission of media files to the collection for sale based on the prediction information. The ability to predict how likely a user is to interact with a media file is also of benefit to end users of media search software, as the predictions can be used to sort media search results in a manner that returns media with the highest likelihood of relevance to a search.

According to one embodiment of the present disclosure, a method is provided. The method includes generating a primary data vector for a media file based on a stored data representation of the media file, and providing the data vector for the media file to an algorithm for predicting a marketability of the media file based on past interaction information for at least one other media file from a collection of media files having a degree of similarity with the media file above a threshold similarity value. The method also includes receiving, as an output of the algorithm, a marketability score for the media file, the marketability score indicative of a likelihood that a user will download the media file.

In certain aspects of the method, the at least one other media file includes a plurality of other media files, and the algorithm for predicting a marketability of the media file is configured to generate a plurality of additional data vectors for the plurality of other media files, identify a position of the primary data vector and the plurality of additional data vectors in a vector space, determine, based on the positions of the primary data vector and the plurality of additional data vectors in the vector space, that the primary data vector and the plurality of additional data vectors are within a distance threshold to one another, analyze past user interaction with the plurality of other media files, generate, for each of the plurality of other media files, a similarity score representing a similarity in the vector space between the media file and the plurality of other media files, and generate the marketability score for the media file based on the similarity scores and the past user interaction with the at least one other media file.

In these aspects of the method, generating the marketability score for the media file based on the similarity scores and the past user interaction with the at least one other media file includes forming a weighted average by multiplying, for each of the plurality of other media files, the respective similarity score between the corresponding other media file and the media file times the average download rate of the corresponding other media file over a period of time. In these aspects of the method, the similarity score is generated using a Hamming distance between the corresponding other media file and the at least one media file, or using cosine similarity algorithm. In these aspects of the method, the weighted average is weighted at least in part based on a distance between the primary data vector for the media file in the vector space and the data vector in the vector space for the corresponding other media file.

In certain aspects of the method, the algorithm for predicting a marketability of the media file is configured to generate a plurality of other data vectors for the media files in the collection of media files, cluster the plurality of other data vectors into a predetermined number of clusters according to a clustering algorithm, generate a marketability value for each of the predetermined number of clusters based on past interaction information for the media files corresponding to the data vectors in the corresponding cluster, assign the primary data vector to at least one of the predetermined number of clusters using the clustering algorithm, and generate the marketability score for the media file based on the marketability value for the at least one cluster to which the primary data vector is assigned.

In these aspects of the method, the primary data vector is assigned to a plurality of the predetermined number of clusters using the clustering algorithm, and the marketability score for the media file is generated based on the marketability value for the plurality of the predetermined number of clusters to which the primary data vector is assigned. In these aspects of the method, the marketability value for a cluster is based on the average download rate of all of the media files in the cluster over a period of time. In these aspects of the method, the primary data vector and each of the plurality of other data vectors is generated using a convolutional neural network.

In certain aspects of the method, the at least one other media file includes a plurality of other media files, and the algorithm for predicting a marketability of the media file is configured to generate a plurality of other data vectors for the media files in the collection of media files and a download indicator identifying of whether the media file corresponding to the data vector was previously downloaded, provide the plurality of other data vectors and their corresponding download indicators to a supervised learning algorithm to generate a mapping function that maps a vector representation of an input media file to a probability that the input media file will be downloaded, apply the mapping function generated by the supervised learning algorithm to the primary data vector for the media file to generate a probability that the media file will be downloaded, and generate the marketability score for the media file based on the probability that the media file will be downloaded.

In these aspects of the method, the other data vector corresponding to a media file in the collection and its corresponding download indicator is provided to the supervised learning algorithm according to the number of times the corresponding media file has been downloaded by a user.

According to another embodiment of the present disclosure, a system is provided. The system includes a memory including a media file, and a processor. The processor is configured to execute instructions to generate a primary data vector for a media file based on a stored data representation of the media file, provide the data vector for the media file to an algorithm for predicting a marketability of the media file based on past interaction information for at least one other media file from a collection of media files having a degree of similarity with the media file above a threshold similarity value, and receive, as an output of the algorithm, a marketability score for the media file, the marketability score indicative of a likelihood that a user will download the media file.

In certain aspects of the system, the at least one other media file includes a plurality of other media files, and wherein the algorithm for predicting a marketability of the media file is configured to generate a plurality of additional data vectors for the plurality of other media files, identify a position of the primary data vector and the plurality of additional data vectors in a vector space, determine, based on the positions of the primary data vector and the plurality of additional data vectors in the vector space, that the primary data vector and the plurality of additional data vectors are within a distance threshold to one another, analyze past user interaction with the plurality of other media files, generate, for each of the plurality of other media files, a similarity score representing a similarity in the vector space between the media file and the plurality of other media files, the similarity score generated using a Hamming distance between the corresponding other media file and the at least one media file, or using cosine similarity algorithm, and generate the marketability score for the media file based on the similarity scores and the past user interaction with the at least one other media file by forming a weighted average including multiplying, for each of the plurality of other media files, the respective similarity score between the corresponding other media file and the media file times the average download rate of the corresponding other media file over a period of time.

In these aspects of the system, the weighted average is weighted at least in part based on a distance between the primary data vector for the media file in the vector space and the data vector in the vector space for the corresponding other media file.

In certain aspects of the system, the algorithm for predicting a marketability of the media file is configured to generate a plurality of other data vectors for the media files in the collection of media files, cluster the plurality of other data vectors into a predetermined number of clusters according to a clustering algorithm, generate a marketability value for each of the predetermined number of clusters based on past interaction information for the media files corresponding to the data vectors in the corresponding cluster, assign the primary data vector to at least one of the predetermined number of clusters using the clustering algorithm, and generate the marketability score for the media file based on the marketability value for the at least one cluster to which the primary data vector is assigned.

In these aspects of the system, the primary data vector is assigned to a plurality of the predetermined number of clusters using the clustering algorithm, and the marketability score for the media file is generated based on the marketability value for the plurality of the predetermined number of clusters to which the primary data vector is assigned. In these aspects of the system, the marketability value for a cluster is based on the average download rate of all of the media files in the cluster over a period of time, and wherein the primary data vector and each of the plurality of other data vectors is generated using a convolutional neural network.

In certain aspects of the system, the at least one other media file includes a plurality of other media files, and the algorithm for predicting a marketability of the media file is configured to generate a plurality of other data vectors for the media files in the collection of media files and a download indicator identifying of whether the media file corresponding to the data vector was previously downloaded, provide the plurality of other data vectors and their corresponding download indicators to a supervised learning algorithm to generate a mapping function that maps a vector representation of an input media file to a probability that the input media file will be downloaded, apply the mapping function generated by the supervised learning algorithm to the primary data vector for the media file to generate a probability that the media file will be downloaded, and generate the marketability score for the media file based on the probability that the media file will be downloaded.

In certain aspects of the system, the other data vector corresponding to a media file in the collection and its corresponding download indicator is provided to the supervised learning algorithm according to the number of times the corresponding media file has been downloaded by a user.

According to a further embodiment of the present disclosure, a non-transitory machine-readable storage medium including machine-readable instructions for causing a processor to execute a method is provided. The method includes generating a primary data vector for a media file based on a stored data representation of the media file, providing the data vector for the media file to an algorithm for predicting a marketability of the media file based on past interaction information for at least one other media file from a collection of media files having a degree of similarity with the media file above a threshold similarity value, and receiving, as an output of the algorithm, a marketability score for the media file, the marketability score indicative of a likelihood that a user will download the media file.

According to yet a further embodiment of the present disclosure, a system is provided. The system includes means for storing a media file, and means for generating a primary data vector for a media file based on a stored data representation of the media file, providing the data vector for the media file to an algorithm for predicting a marketability of the media file based on past interaction information for at least one other media file from a collection of media files having a degree of similarity with the media file above a threshold similarity value, and receiving, as an output of the algorithm, a marketability score for the media file, the marketability score indicative of a likelihood that a user will download the media file.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

Figure 1:
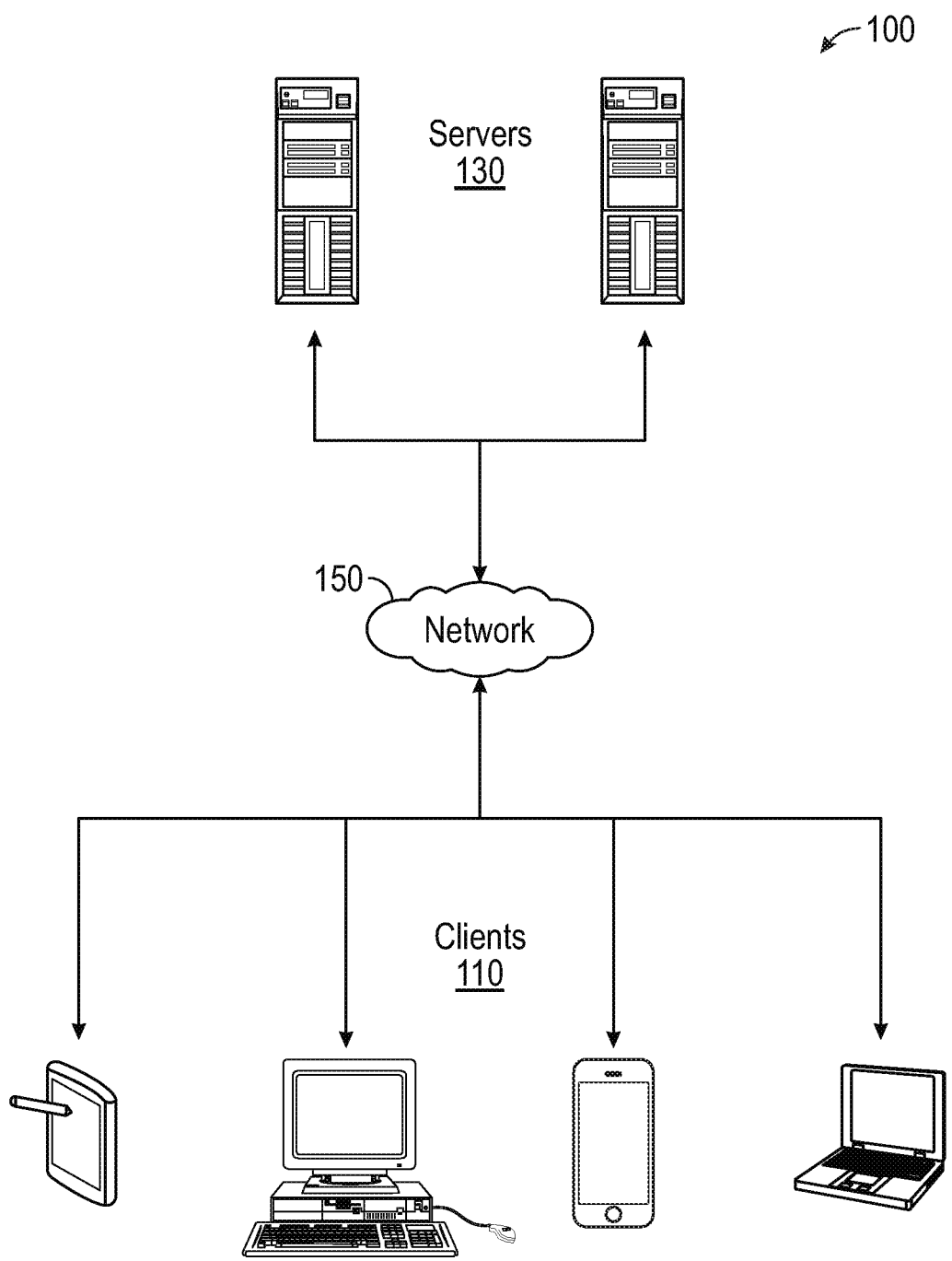
FIG. 1 illustrates an example architecture for analyzing existing interaction data for a collection of media files to predict a likelihood that a user will interact with another media file.

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

The disclosed system provides for generating a data vector for a media file and providing the data vector to an algorithm that analyzes the data vector for the media file against data vectors for other media files and past interaction data for those media files in order to generate a marketability score for the media file indicative of how likely a user is to interact with (e.g., download or purchase) the media file. This is particularly helpful where the media file is a newly provided media file to a collection of media files and consequently no interaction data for the newly provided media file exists. As a result of this analysis, the newly provided media file can be positioned according to the marketability score with other media files with past interaction data in response to a search query, whereas previously it would be unclear where to position, if anywhere at all, the newly provided media file with other media files with past interaction data in response to the search query.

The marketability score for a provided media file can be generated according to various approaches. For example, in a first approach, a collection of media files is summarized into image vectors for each of the collection media files, and the image vectors for the collection media files that are most similar to the image vector (e.g., using a Hamming distance or cosine similarity algorithm) are identified. The past interaction data for the collection media files corresponding to the similar image vectors is used to generate a score for each of the collection media files, and a marketability score for the provided media file is generated based on the scores for each of the collection media files.

As another example, in a second approach, the collection of media files is again summarized into image vectors for each of the collection media files, and the image vectors for the collection media files are then clustered into a predetermined number of clusters (e.g., 1000 clusters) using a clustering algorithm. A marketability value is then generated for each cluster based on past interaction information for the collection media files associated with the image vectors in the cluster, and the provided image is assigned a marketability score based on the marketability value for the cluster to which an image vector for the provided media file would have been assigned based on the clustering algorithm.

As a further example, in a third approach, the collection of media files is again summarized into image vectors for each of the collection media files, and the image vectors for each of the collection media files along with an indicator of whether the corresponding media file was previously downloaded is provided to a supervised learning algorithm to generate a mapping function to map the image vectors for each of the collection media files to a download probability. Thereafter, when the mapping function is applied to the image vector for the provided media file to generate a download probability for the provided media file, a marketability score for the provided media file can be generated based on the download probability for the provided media file.

The disclosed system addresses the technical problem of analyzing data vectors for stored data files accessible over a computer network to generate values, in certain aspects, indicative of mathematical probabilities based on prior access to the stored data files over the computer network, which is a problem tied to computer technology and arising in the realm of computer networks. The disclosed system addresses the technical problem using a technical solution, namely, generating a data vector for a stored data file and providing the data vector to an algorithm that analyzes the data vector for the stored data file against data vectors for other stored data files and past interaction data for those stored data files in order to generate a marketability score for the stored data files indicative of how likely a user is to interact with the stored data file. As a result of the technical solution, the disclosed algorithms for generating a marketability score for a stored data file can be advantageously used for the particular useful application of predicting a marketability of a newly provided media file for display in response to a search query for media files.

As discussed herein, a marketability score for a target media file that is generated based on past user interaction with other media files is a score indicative of a likelihood that a user will similarly interact with the target media file. For example, if a marketability score for a newly uploaded image is generated using the systems and methods disclosed herein based on past download history for similar media files, then the marketability score for the newly uploaded image will be indicative of a likelihood that a user will download the newly uploaded image. Furthermore, although the examples discussed herein may refer to a previous downloading of a media file as an indication of a marketability of a media file, other examples of marketability are contemplated, including selection of the media file, editing of the media file, liking of a media file, or interaction with the media file using an input device.

FIG. 1 illustrates an example architecture for analyzing existing interaction data for a collection of media files to predict a likelihood that a user will interact with another media file. The architecture 100 includes servers 130 and clients 110 connected over a network 150.

One of the many servers 130 is configured to host a media file marketability prediction algorithm, a collection of media files, and a primary data vector for a media file. For purposes of load balancing, multiple servers 130 can host the marketability prediction algorithm, the collection of media files, and the primary data vector for the media file. In certain aspects, however, media files and their corresponding data vectors may be provided over the network 150 from other devices, such as devices owned by users that generate the media files for consumption.

The disclosed system provides for a way to advantageously predict a marketability of a media file without reference to any past interaction (e.g., download) data for the media file. The marketability prediction, which can be provided as a marketability score, provides, for example, an indication of how likely a user is to interact with (e.g., download, purchase, etc.) a newly provided media file, which is helpful for determining which new media files to provide in addition to existing media files having past interaction data in response to a search query received, for example, by one of the servers 130 from one of the clients 110 over the network 150. The servers 130 can be any device having an appropriate processor, memory, and communications capability for hosting the media file marketability prediction algorithm, the collection of media files, and the primary data vector for the media file. The clients 110 can be, for example, desktop computers, mobile computers, tablet computers, mobile devices (e.g., a smartphone or PDA), or any other devices having appropriate processor, memory, and communications capabilities. The network 150 can include, for example, any one or more of a local area network (LAN), a wide area network (WAN), the Internet, and the like. Further, the network 150 can include, but is not limited to, any one or more of the following network topologies, including a bus network, a star network, a ring network, a mesh network, a star-bus network, tree or hierarchical network, and the like.

The marketability prediction of a new media file is also helpful for creators of media files to better determine which new media files, from among many new media files they create, are likely to elicit greater interaction from a user. The marketability prediction can be provided according to various algorithms, including algorithms that involve using a k-nearest neighbors algorithm, a clustering algorithm, or a supervised learning algorithm.

Figure 2:
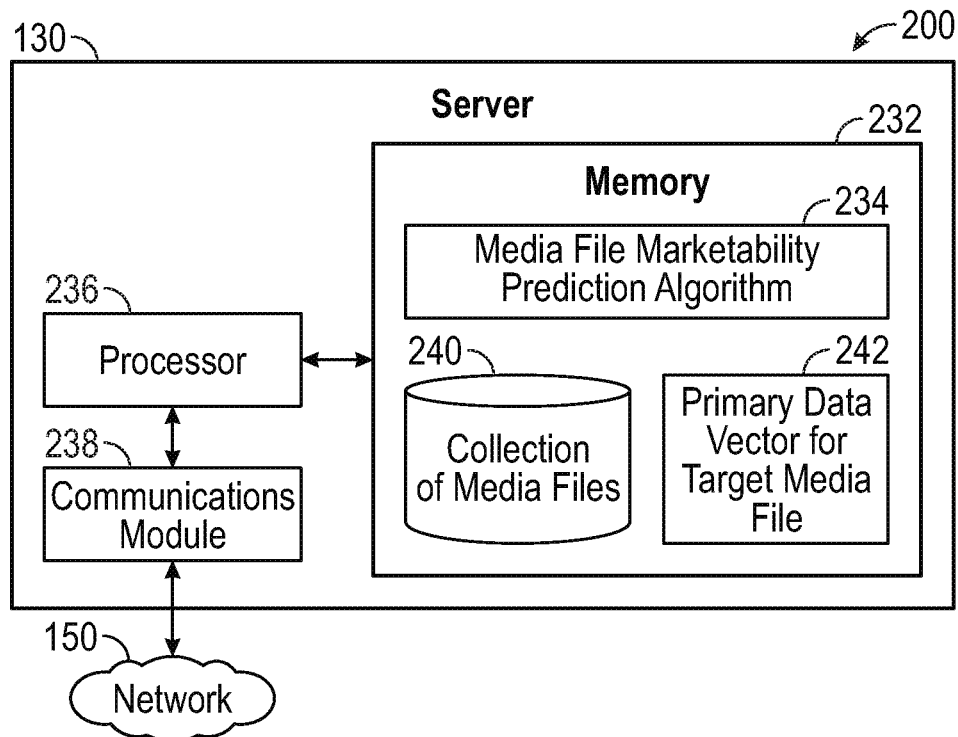
FIG. 2 is a block diagram illustrating an example server from the architecture of FIG. 1 according to certain aspects of the disclosure.

FIG. 2 is a block diagram illustrating an example server 130 from the architecture 100 of FIG. 1 according to certain aspects of the disclosure. The server 130 is connected over the network 150 via a communications module 238 to receive, for example, search queries from a client (not illustrated) for media files from a collection of media files. The communications module 238 is configured to interface with the network 150 to send and receive information, such as data, requests, responses, and commands to and from other devices on the network 150, such as the client (not illustrated). The communications module 238 can be, for example, a modem or Ethernet card.

The server 130 includes a processor 236, a communications module 238, and a memory 232 that includes a media file marketability prediction algorithm 234, a collection of media files 240, and a primary data vector for a target media file 242. The processor 236 of the server 130 is configured to execute instructions, such as instructions physically coded into the processor 236, instructions received from software in memory 240, or a combination of both. For example, the processor 236 of the server 130 executes instructions to generate a primary data vector for a target media file 242 based on a stored data representation of the media file and provide the data vector for the media file to an algorithm 234 for predicting a marketability of the media file based on past interaction information for one or many other media files from the collection of media files 240, the other media file(s) having a degree of similarity with the media file above a threshold similarity value. The processor 236 is further configured to receive, as an output of the algorithm, a marketability score for the media file, the marketability score indicative of a likelihood that a user will download the media file.

In certain aspects, a first approach to the algorithm 234 for predicting a marketability of a target media file includes the steps of generating additional data vectors for the other media files from the collection 240, and positioning the primary data vector and the additional data vectors in a vector space. For example, a model can be trained that maps an image to a dense vector representation of that image, and with the mapping function generated by the model, the mapping function may map all media files in the collection 240 to their dense vector representations in a dense vector space. The model can be generated, for example, using a convolutional neural network.

The first approach to algorithm 234 also includes the steps of identifying a position of the primary data vector and the additional data vectors in the vector space and determining, based on the positions of the primary data vector and the additional data vectors in the vector space, that the primary data vector and a subset of the additional data vectors are within a distance threshold to one another. For example, when a new image (i.e., the target media file) is presented to the algorithm 234, all media files already in the collection 240 are analyzed in order to identify the k nearest neighbors to that target media file in the dense vector space where k is a hyper-parameter to the method. The parameter k can be configured by a user to adjust how many neighbors are identified for the target media file.

The first approach to algorithm 234 further includes the steps of analyzing past user interaction with the media files from the collection 240 corresponding to the subset of additional vectors that are within the distance threshold to the primary data vector for the target media file 242. For example, for the media files from the collection 240 corresponding to the k nearest neighbors of the target media file, previous download data for each of the media files can be determined from behavioral logs in order to calculate certain metrics, such as an average number of downloads or number of clicks per day for each of the media files from the collection 240 corresponding to the k nearest neighbors of the target media file. Other metrics indicative of user interaction with the media files from the collection 240 corresponding to the k nearest neighbors of the target media file can be used, such as an average number of clicks by a user for a corresponding media file. The user interaction metric that is used for this analysis will be the same type of user interaction that is predicted or otherwise indicated by the marketability score to be calculated for the target media file 242.

The first approach to algorithm 234 yet further includes generating, for each of the media files from the collection 240 corresponding to the subset of additional vectors that are within the distance threshold to the primary data vector for the target media file 242, a similarity score representing a similarity in the vector space between the target media file and the media files from the collection 240 corresponding to the subset of additional vectors that are within the distance threshold to the primary data vector for the target media file 242. For example, for a new image (i.e., the target media file), a similarity score is computed in the dense vector space between the new image and each of the k nearest images that captures the degree t to which the pair of images are visually similar to one another. In certain aspects where one image is nearer to the new image than another among the k nearest images, the closer image can be weighted to place a greater value on the similarity score of that closer image. The similarity score can be generated using a Hamming distance between the target media file and the corresponding media file from the collection 240 corresponding to the subset of additional vectors that are within the distance threshold to the primary data vector for the target media file 242 or using a cosine similarity algorithm using the data vectors for the target media file 242 and the corresponding additional vector within the distance threshold.

The first approach to algorithm 234 concludes with the step of generating a marketability score for the target media file based on the similarity scores and the past user interaction with the media files from the collection 240 corresponding to the subset of additional vectors that are within the distance threshold to the primary data vector for the target media file 242. The marketability score for the target media file can be generated, for example, by forming a weighted average by multiplying, for each of the media files from the collection 240 corresponding to the subset of additional vectors that are within the distance threshold to the primary data vector for the target media file 242, the respective similarity score for that media file from that subset and the target media file times the average download rate or click rate of that media file from the subset over a period of time. The weighted average can be weighted at least in part based on a distance between the primary data vector for the target media file 242 in the vector space and the data vector in the vector space for the corresponding other media file.

For example, for a new image (i.e., the target media file) the marketability score can be calculated as the weighted average formed over all images i in k that is equal to: similarity (new image, neighbor i)*average download rate (neighbor i), where similarity (new image, neighbor i) is a function that captures how similar a pair of images is, for example using a Hamming distance or cosine similarity, and also includes any necessary scaling of the raw value. To calculate the Hamming distance, vectors are first converted to Hamming vectors by multiplying each vector by a matrix of random Gaussian values, and then each resulting value is coded as 0 if it less than 0 and as 1 if it is at least 0.

In certain aspects, a second approach to the algorithm 234 for predicting a marketability of a target media file includes the steps of generating additional data vectors for the media files in the collection of media files 240. In other words, a model is trained that maps an image to a dense vector representation of that image. In certain aspects, the model for generating the primary data vector 242 and each of the additional data vectors is created and trained using a convolutional neural network. The convolutional neural network can be a type of feed-forward artificial neural network where individual neurons are tiled in such a way that the individual neurons respond to overlapping regions in a visual field. The architecture of the convolutional neural network may be in the style of existing well-known image classification architectures such as AlexNet, GoogLeNet, or Visual Geometry Group models. In certain aspects, the convolutional neural network consists of a stack of convolutional layers followed by several fully connected layers. The convolutional neural network can include a loss layer (e.g., softmax or hinge loss layer) to back propagate errors so that the convolutional neural network learns and adjusts its weights to better fit provided image data.

In a subsequent step of the second approach to algorithm 234, the additional data vectors are clustered into a predetermined number of clusters according to a clustering algorithm, for example, using k-means clustering or another method of vector quantization. For example, the additional data vectors for the media files from the collection of the media files 240 can be assigned to clusters by the clustering algorithm based on a similarity threshold. The number of clusters can be manually selected, such as, for example, designating that the collection of the media files 240 be divided into 1000 clusters. The additional data vectors for the media files from the collection 240 can be designated to belong to one of the clusters based on a similarity threshold using a clustering algorithm. The similarity threshold can indicate visual similarity, conceptual similarity, keyword similarity, or another measurement of similarity between media files.

The second approach to algorithm 234 also includes the step of generating a marketability value for each of the predetermined number of clusters based on past interaction information for the media files corresponding to the data vectors in the corresponding cluster. For example, for each cluster, the past interaction information (e.g., number of downloads) can be used to map an identifier of the cluster to a measure of that cluster's marketability, such as, for example, computing the average download rate of all media files in a cluster over a period of time.

The second approach to algorithm 234 further includes the steps of assigning the primary data vector 242 to at least one of the predetermined number of clusters using the clustering algorithm, and generating a marketability score for the target media file based on the marketability value for the cluster to which the primary data vector is assigned. In certain aspects, the primary data vector 242 can be assigned to multiple clusters using the clustering algorithm, and the marketability score for the target media file can be generated based on the marketability value for the multiple clusters to which the primary data vector 242 is assigned. For example, if a media file is an image of a cat on a deck chair, then the media file may be assigned to both a cluster of images of cats and a cluster of images of deck chairs, the closer the media file is in vector space to each of the clusters the more the media file's marketability score can be weighted based on that proximity to each of the two clusters.

One advantage of the second approach to algorithm 234 over the first approach to algorithm 234 is that the second approach localizes marketability of a media file based on the kind of image, namely, by associating marketability of a media file with the cluster of similar media files to which it is assigned.

In certain aspects, a third approach to the algorithm 234 for predicting a marketability of a target media file includes the step of generating other data vectors for the media files in the collection of media files 240 and a download indicator identifying of whether the media file corresponding to the data vector was previously downloaded. For example, by way of pre-processing, as input, historical records identifying whether users downloaded images from the collection of media files 240 that were presented to them can be analyzed, such as web traffic logs from an image search engine for the collection of media files 240. The output can be a list of processed training examples, each of which includes two elements for a historical presentation of the image to the user. Each item in the list can include a vector representation of the image (e.g., the values of the pixel intensities of the image, or the values of a vector representation of the image generated by a separate system), and a binary variable set to 1.0 if the image was downloaded, and set to 0.0 if the image was not downloaded. As another example, when an image is stored on disk (e.g. as a JPEG file), the image can be thought of as a matrix of pixel intensity values. This matrix can be rearranged to be a data vector of pixel intensities; for example, if a 2-by-2 image had pixel intensities of 1 in the (1,1) position, 2 in the (1,2) position, 3 in the (2,1) position, and 4 in the (2,2) position, the image could be represented as the 1-by-4 data vector: [1, 2, 3, 4]. Such a representation of the image is one entity that supervised learning algorithm can train and predict on for all methods described in the present disclosure. In addition, it is further beneficial to first separately train a convolutional neural network as described above, and use the trained convolutional neural network to transform the above data vector as a first step prior to training or generating predictions, and as such, the data vectors described herein can optionally and often optimally be passed through such a trained a convolutional neural network.

Alternatively, instead of a vector representation of the image, pixel data can be used for the image. Other alternatives include fisher vectors and color histograms. The processed training examples of media files can include positive examples and synthetic negative examples of media files, as disclosed in U.S. patent application Ser. No. 15/009,037, titled "Identification Of Synthetic Examples For Improving Search Rankings" and incorporated by reference herein in its entirety. In certain aspects, the order of presentation of data vectors and download indicators (actual or synthetic) may be randomized when presented to the supervised learning algorithm during training; it is beneficial, for example, to prevent all positive or negative examples from being shown first during training, which would lead to suboptimal outcomes for some supervised learning algorithms.

The third approach to algorithm 234 also includes the step of providing the other data vectors and their corresponding download indicators to a supervised learning algorithm to generate a mapping function that maps a vector representation of an input media file to a probability that the input media file will be downloaded. For example, a supervised learning algorithm, such as a logistic regression model, can be trained to learn a mapping function that maps a vector representation of an image or other media file to a predicted probability that a user will download that image. The inputs for the training would be the list of processed training examples described above, and a choice of a supervised learning algorithm (e.g., logistic regression). In certain aspects, the data vector corresponding to a media file in the collection and its corresponding download indicator are provided to the supervised learning algorithm according to the number of times the corresponding media file has been downloaded by a user. For example, a processed training example would be input to the supervised learning model the number of times it was engaged with (e.g., if an image was downloaded twelve times, the processed training example corresponding to that image would be provided twelve times to the supervised training model). The output of the supervised learning model would be a mapping function that maps vector representations of any image or other media file to the predicted probability that a user will download that image. Other supervised learning algorithms may be used, such as an online logistic regression model, a neural network, or linear regression model.

The third approach to algorithm 234 further includes the steps of applying the mapping function generated by the supervised learning algorithm to the primary data vector for the target media file 242 to generate a probability that the target media file will be downloaded, and generating the marketability score for the target media file based on the probability that the target media file will be downloaded. For example, the disclosed system according to the third approach to algorithm 234 may predict a probability that a user will download a supplied image, as a proxy for marketability, by receiving as an input the mapping function (i.e., output from the supervised learning model discussed above) that maps vector representations of any image to the predicted probability that a user will download that image, and a mapping function that maps images to a vector representation of the image (i.e., using the convolutional neural network discussed above), and would output the mapping function described above capable of predicting the download probability, a proxy for marketability, for an arbitrary input media file, including previously unseen images not included in the training of the supervised learning model, such as the supplied image.

The functional operation of the supervised learning algorithm for the third approach to algorithm 234 can be configured based on various optimizations. In certain aspects, a machine learning pipeline can be created to pre-process the historical records described above to train the supervised learning algorithm. In certain aspects, the machine learning pipeline could be executed on a scheduled, recurring basis, it could be executed whenever a pre-specified amount of previously unseen historical training data accumulates, or both. For example, the machine learning pipeline can be scheduled to run once a day, or the machine learning pipeline is run whenever one million new training examples are available. The output of the machine learning pipeline can be a new mapping function that maps vector representations of any media file to the predicted probability that a user will download that media file, as described above. This new mapping function would replace any previous mapping functions for purposes of predicting download probability, which is a proxy for marketability. The new mapping function may be made available on another server while the previous mapping function remains available on the server 130, or alternatively the new mapping function can also be made available on the server 130 in addition to the old mapping function on the server 130 until a time when the new mapping function replaces the old mapping function.

In certain aspects where an online supervised learning algorithm is used for the third approach to algorithm 234, such as a logistic regression model with stochastic gradient descent, a user's decision whether to download a media file displayed to the user from the collection of media files 240 can be used to immediately update the learned function of predicted download probability (e.g., to update the training of the logistic regression model). In these aspects, the time needed before the disclosed system can reflect new user behavior can be reduced, for example, which can be advantageous to reflect a preference for certain types of media files based on the time of year, or a trend in fashion which alters the marketability of a certain class of clothing images from the collection of media files 240.

Figure 3:
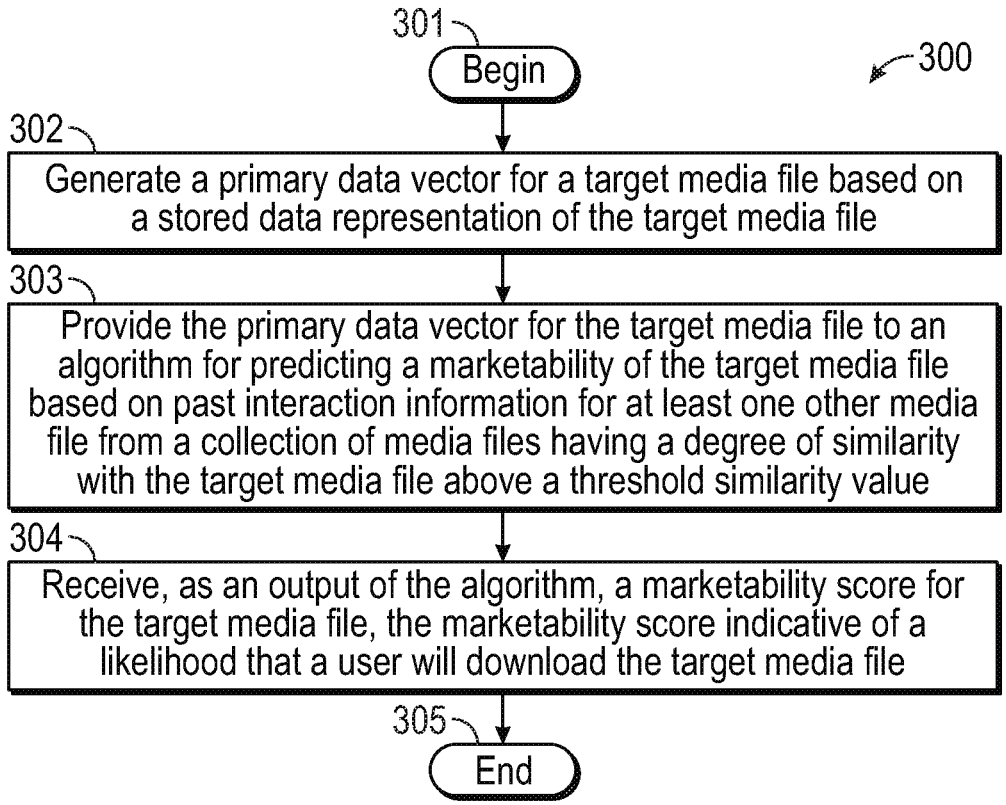
FIG. 3 illustrates an example process providing a data vector (or "primary data vector") for a media file to an algorithm for predicting a marketability of the media file to generate a marketability score for the media file using the example server of FIG. 2.

FIG. 3 illustrates an example process 300 for analyzing existing interaction data for a collection of media files to predict a likelihood that a user will interact with another media file using the example server 130. While FIG. 3 is described with reference to FIG. 2, it should be noted that the process steps of FIG. 3 may be performed by other systems.

The process 300 begins by proceeding from beginning step 301 when a request is received to provide a marketability score for a target media file to step 302 when a primary data vector 242 is generated for a target media file based on a stored data representation of the target media file (e.g., in response to being provided a target media file or target media identifier over the network 150). Next, in step 303, the primary data vector 242 for the target media file is provided to the algorithm 234 for predicting a marketability of the target media file based on past interaction information for at least one other media file from the collection of media files 240 having a degree of similarity with the target media file above a threshold similarity value. Finally, in step 304, a marketability score for the target media file is received as an output of the algorithm, the marketability score indicative of a likelihood that a user will download the target media file, and the process 300 ends in step 305.

Figure 4:
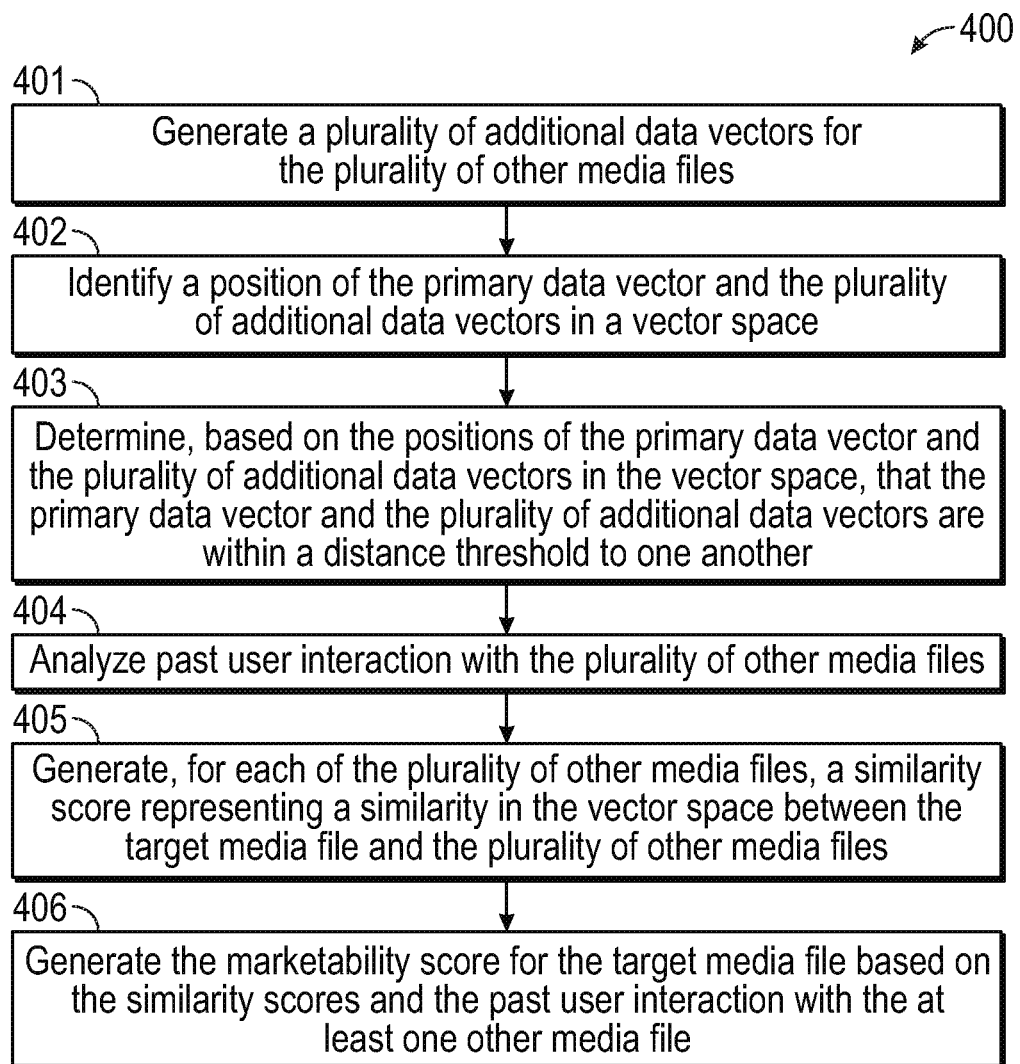
FIG. 4 illustrates a first example process for predicting a marketability of a media file based on past interaction information for at least one other media file from a collection of media files.

FIG. 4 illustrates a first example process 400 for predicting a marketability of a media file based on past interaction information for at least one other media file from a collection of media files. The first example process 400 for predicting a marketability of a media file includes a first step 401 of generating a plurality of additional data vectors for the plurality of other media files, a second step 402 of identifying a position of the primary data vector 242 and a plurality of additional data vectors in a vector space, and a third step 403 of determining, based on the positions of the primary data vector 242 and the plurality of additional data vectors in the vector space, that the primary data vector and the plurality of additional data vectors are within a distance threshold to one another. Next, in step 404, past user interaction with the plurality of other media files is analyzed, and in step 405 a similarity score representing a similarity in the vector space between the target media file and the plurality of other media files is generated for each of the plurality of other media files. Finally, in step 406, the marketability score for the target media file is generated based on the similarity scores and the past user interaction with the at least one other media file.

Figure 5:
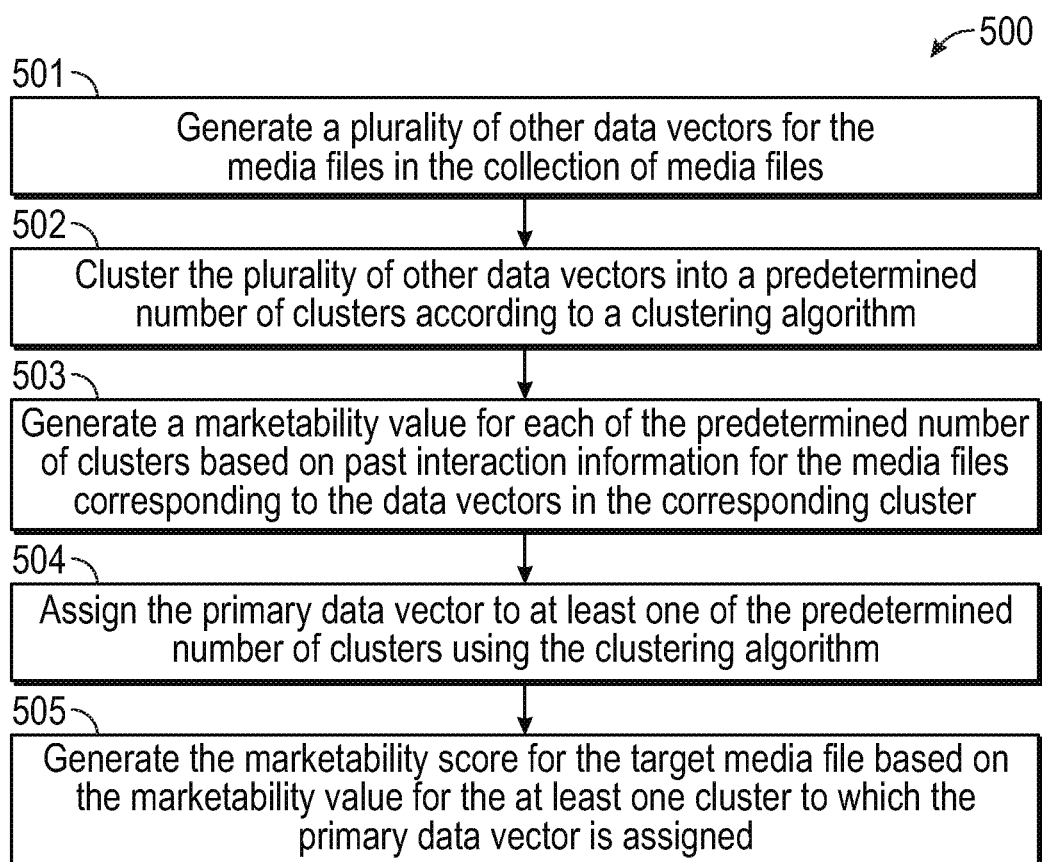
FIG. 5 illustrates a second example process for predicting a marketability of a media file based on past interaction information for at least one other media file from a collection of media files.

FIG. 5 illustrates a second example process 500 for predicting a marketability of a media file based on past interaction information for at least one other media file from a collection of media files. The second example process 500 for predicting a marketability of a media file includes a first step 501 of generating a plurality of other data vectors for the media files in the collection of media files 240, and a second step 502 of clustering the plurality of other data vectors into a predetermined number of clusters according to a clustering algorithm. Next, in step 503, a marketability value for each of the predetermined number of clusters is generated based on past interaction information for the media files corresponding to the data vectors in the corresponding cluster, and in step 504 the primary data vector 242 is assigned to at least one of the predetermined number of clusters using the clustering algorithm. In final step 505, the marketability score for the target media file is generated based on the marketability value for the at least one cluster to which the primary data vector is assigned.

Figure 6:
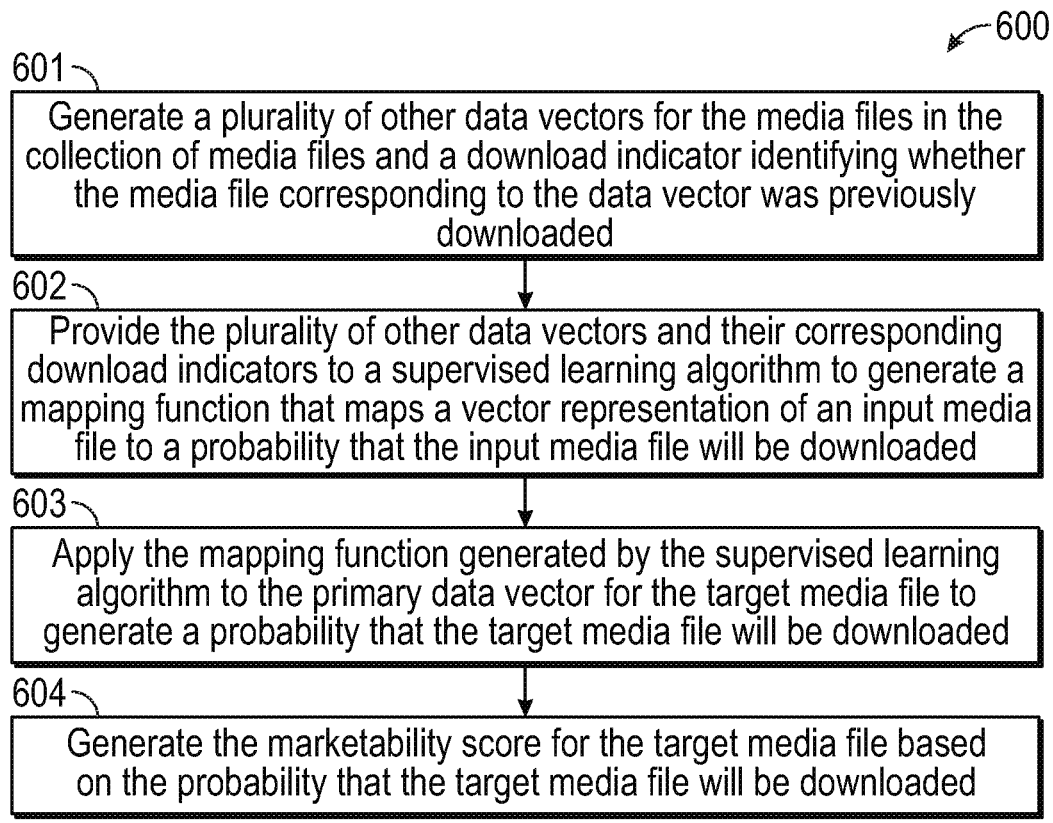
FIG. 6 illustrates a second example process for predicting a marketability of a media file based on past interaction information for at least one other media file from a collection of media files.

FIG. 6 illustrates a third example process 600 for predicting a marketability of a media file based on past interaction information for at least one other media file from a collection of media files. The third example process 600 for predicting a marketability of a media file includes a first step 601 of generating a plurality of other data vectors for the media files in the collection of media files 240 and a download indicator identifying whether the media file corresponding to the data vector was previously downloaded, and a second step 602 of providing the plurality of other data vectors and their corresponding download indicators to a supervised learning algorithm to generate a mapping function that maps a vector representation of an input media file to a probability that the input media file will be downloaded. Next, in step 603, the mapping function generated by the supervised learning algorithm is applied to the primary data vector for the target media file 242 to generate a probability that the target media file will be downloaded, and in final step 604 the marketability score for the target media file is generated based on the probability that the target media file will be downloaded.

FIGS. 3-6 set forth an example processes 300, 400, 500, and 600 for analyzing existing interaction data for a collection of media files to predict a likelihood that a user will interact with another media file and for predicting a marketability of a media file based on past interaction information for at least one other media file from a collection of media files using the example server 130 of FIG. 2. An example will now be described using the example processes 300 and 600 of FIGS. 3 and 6, a target media file that is a newly uploaded image of a sports car, and subsequent receipt of a search query for "sports cars" for the collection of media files 240.

Figure 7:
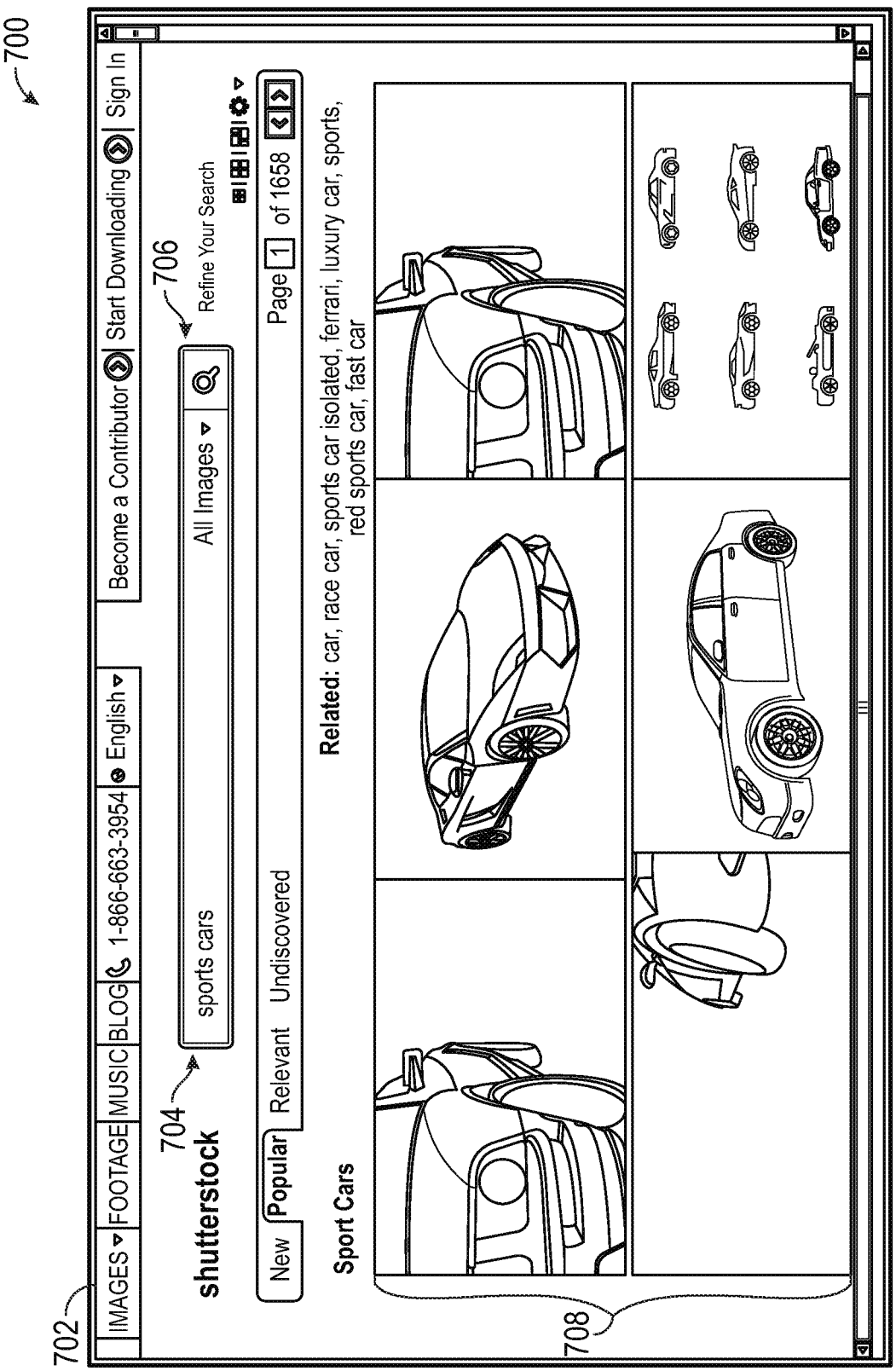
FIG. 7 is an example illustration of an interface displaying media files responsive to a search query that are displayed according to the marketability scores of the process of FIG. 3.

The process 300 begins by proceeding from beginning step 301 in response to a contributor to the collection of media files 240 providing a recently photographed image of a sports car for upload to the collection of media files 240. In step 302, a primary data vector 242 is generated for the newly uploaded photographed image of a sports car based on the photographic image file that was uploaded. Next, in step 303, the primary data vector 242 for the newly uploaded photographed image of a sports car is provided to the mapping function that maps an image to its corresponding convolutional neural network generated vector representation, which is then mapped to the predicted probability that a user will download that image generated for the third approach to algorithm 234 described in the process 600 of FIG. 6. Specifically, the mapping function generated in step 602 of the process 600 of FIG. 6 is applied in step 603 of process 600 by the supervised learning algorithm to the primary data vector 242 for the newly uploaded photographed image of a sports car to generate a probability that the newly uploaded photographed image of a sports car will be downloaded, and then in step 604 a marketability score for the newly uploaded photographed image of the sports car is generated based on the probability that the newly uploaded photographed image of the sports car will be downloaded. Returning to the process 300 of FIG. 3, in step 304, the marketability score for the target media file is received, the marketability score indicative of a likelihood that a user will download the photographed image of the sports car, and the process 300 ends in step 305. Subsequently, a user of a client 110 (of FIG. 1) submits a search query for "sports cars" over the network 150 using a web browser application to a search engine for the collection of media files 240, and the search engine returns an identification of media files from the collection of media files 240 to the user that are responsive to the user's search query for "sports cars" in a web page displayed in the web browser application to the user. The media files identified to the user include an identification of the uploaded photographed image of the sports car because the marketability score associated with the uploaded photographed image of the sports car indicates the photographed image of the sports car is highly marketable (e.g., very likely to be downloaded) in response to the user's search query. An example illustration 700 of the web page identifying the media files from the collection of media files 240 to the user that are responsive to the user's search query for "sports cars" 704, including an identification of the uploaded photographed image of the sports car, as displayed in the web browser application 702 is shown in FIG. 7. The web page includes an input interface 706 for the search engine and a display 708 of the identified media file from the collection of media files 240 responsive to the user's search query for "sports cars" 704, including an identification of the uploaded photographed image of the sports car.

Figure 8:
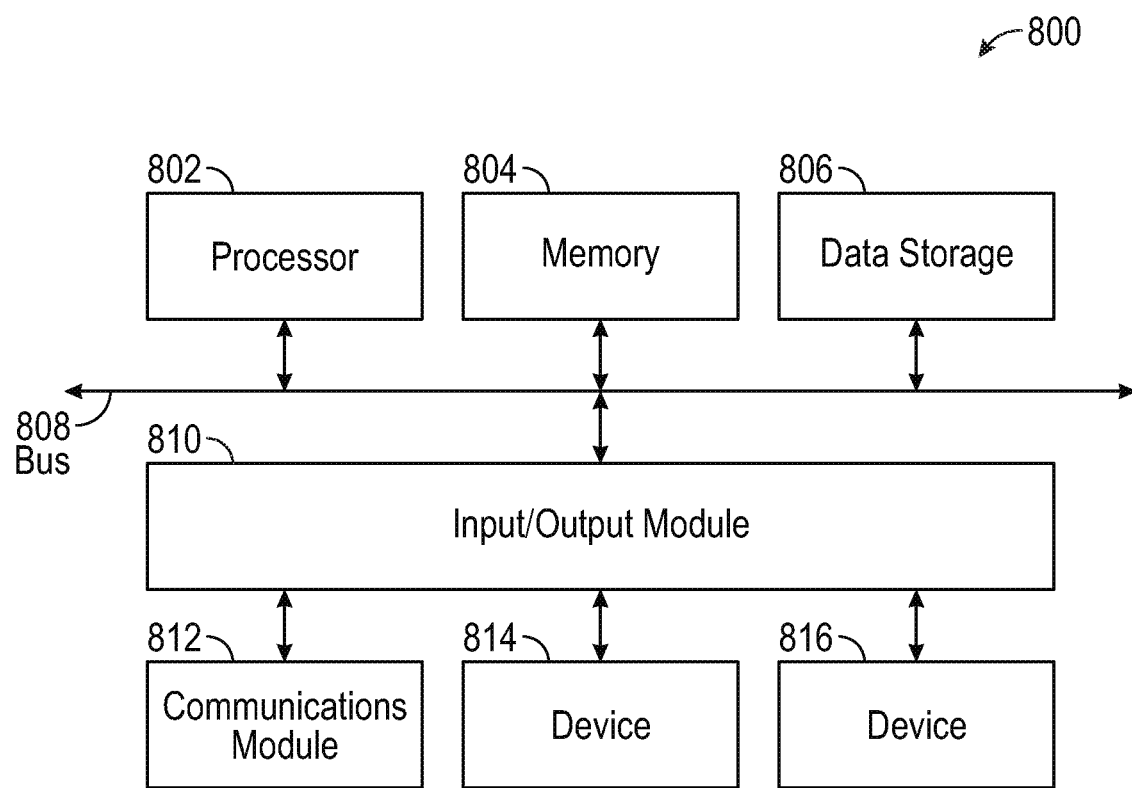
FIG. 8 is a block diagram illustrating an example computer system with which the server of FIG. 2 can be implemented.

FIG. 8 is a block diagram illustrating an example computer system 800 with which the server 130 of FIG. 2 can be implemented. In certain aspects, the computer system 800 may be implemented using hardware or a combination of software and hardware, either in a dedicated server, or integrated into another entity, or distributed across multiple entities.

Computer system 800 (e.g., server 130) includes a bus 808 or other communication mechanism for communicating information, and a processor 802 (e.g., processor 212 and 236) coupled with bus 808 for processing information. By way of example, the computer system 800 may be implemented with one or more processors 802. Processor 802 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 800 can include, in addition to hardware, code that creates an execution environment for the computer program in question, e.g., code that constitutes processor firmware, a protocol stack, a database management system, an operating system, or a combination of one or more of them stored in an included memory 804 (e.g., memory 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 808 for storing information and instructions to be executed by processor 802. The processor 802 and the memory 804 can be supplemented by, or incorporated in, special purpose logic circuitry.

The instructions may be stored in the memory 804 and implemented in one or more computer program products, i.e., one or more modules of computer program instructions encoded on a computer readable medium for execution by, or to control the operation of, the computer system 800, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python): Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 804 may also be used for storing temporary variable or other intermediate information during execution of instructions to be executed by processor 802.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 800 further includes a data storage device 806 such as a magnetic disk or optical disk, coupled to bus 808 for storing information and instructions. Computer system 800 may be coupled via input/output module 810 to various devices. The input/output module 810 can be any input/output module. Exemplary input/output modules 810 include data ports such as USB ports. The input/output module 810 is configured to connect to a communications module 812. Exemplary communications modules 812 (e.g., communications module 238) include networking interface cards, such as Ethernet cards and modems. In certain aspects, the input/output module 810 is configured to connect to a plurality of devices, such as an input device 814 and/or an output device 816. Exemplary input devices 814 include a keyboard and a pointing device, e.g., a mouse or a trackball, by which a user can provide input to the computer system 800. Other kinds of input devices 814 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 816 include display devices, such as a CRT (cathode ray tube) or LCD (liquid crystal display) monitor, for displaying information to the user.

According to one aspect of the present disclosure, the server 130 can be implemented using a computer system 800 in response to processor 802 executing one or more sequences of one or more instructions contained in memory 804. Such instructions may be read into memory 804 from another machine-readable medium, such as data storage device 806. Execution of the sequences of instructions contained in main memory 804 causes processor 802 to perform the process steps described herein. One or more processors in a multi-processing arrangement may also be employed to execute the sequences of instructions contained in memory 804. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 800 can include clients and servers. A client and server are generally remote from each other and typically interact through a communication network. The relationship of client and server arises by virtue of computer programs running on the respective computers and having a client-server relationship to each other. Computer system 800 can be, for example, and without limitation, a desktop computer, laptop computer, or tablet computer. Computer system 800 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions or data to processor [#6]02 for execution. Such a medium may take many forms, including, but not limited to, non-volatile media, volatile media, and transmission media. Non-volatile media include, for example, optical disks, magnetic disks, or flash memory, such as data storage device [#6]06. Volatile media include dynamic memory, such as memory [#6]04. Transmission media include coaxial cables, copper wire, and fiber optics, including the wires that comprise bus [#6]08. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A method comprising:
generating a primary data vector for a media file based on a stored data representation of the media file;
providing the data vector for the media file to an algorithm for predicting a marketability of the media file based on past interaction information for a plurality of other media files from a collection of media files having a degree of similarity with the media file above a threshold similarity value, wherein the algorithm for predicting a marketability of the media file is configured to:
generate a plurality of other data vectors for the media files in the collection of media files and a download indicator identifying of whether the media file corresponding to the data vector was previously downloaded;
provide the plurality of other data vectors and their corresponding download indicators to a supervised learning algorithm to generate a mapping function that maps a vector representation of an input media file to a probability that the input media file will be downloaded;
apply the mapping function generated by the supervised learning algorithm to the primary data vector for the media file to generate a probability that the media file will be downloaded; and
generate a marketability score for the media file based on the probability that the media file will be downloaded;
receiving, as an output of the algorithm, a marketability score for the media file, the marketability score indicative of a likelihood that a user will download the media file; and
providing the media file and media search results for display to another user, the media file ordered among the media search results based on the marketability score for the media file and marketability scores for the media search results.

2. The method of claim 1, wherein the other data vector corresponding to a media file in the collection and its corresponding download indicator is provided to the supervised learning algorithm according to the number of times the corresponding media file has been downloaded by a user.

3. A system comprising:
a memory comprising a media file; and
a processor configured to execute instructions to:
generate a primary data vector for a media file based on a stored data representation of the media file;
provide the data vector for the media file to an algorithm for predicting a marketability of the media file based on past interaction information for a plurality of other media files from a collection of media files having a degree of similarity with the media file above a threshold similarity value, wherein the algorithm for predicting a marketability of the media file is configured to:
generate a plurality of other data vectors for the media files in the collection of media files and a download indicator identifying of whether the media file corresponding to the data vector was previously downloaded;
provide the plurality of other data vectors and their corresponding download indicators to a supervised learning algorithm to generate a mapping function that maps a vector representation of an input media file to a probability that the input media file will be downloaded;
apply the mapping function generated by the supervised learning algorithm to the primary data vector for the media file to generate a probability that the media file will be downloaded; and
generate a marketability score for the media file based on the probability that the media file will be downloaded;
receive, as an output of the algorithm, a marketability score for the media file, the marketability score indicative of a likelihood that a user will download the media file; and
provide the media file and media search results for display to another user, the media file ordered among the media search results based on the marketability score for the media file and marketability scores for the media search results.

4. The system of claim 3, wherein the other data vector corresponding to a media file in the collection and its corresponding download indicator is provided to the supervised learning algorithm according to the number of times the corresponding media file has been downloaded by a user.

5. A non-transitory machine-readable storage medium comprising machine-readable instructions for causing a processor to execute a method comprising:
generating a primary data vector for a media file based on a stored data representation of the media file;
providing the data vector for the media file to an algorithm for predicting a marketability of the media file based on past interaction information for a plurality of other media files from a collection of media files having a degree of similarity with the media file above a threshold similarity value, wherein the algorithm for predicting a marketability of the media file is configured to:
generate a plurality of other data vectors for the media files in the collection of media files and a download indicator identifying of whether the media file corresponding to the data vector was previously downloaded;

provide the plurality of other data vectors and their corresponding download indicators to a supervised learning algorithm to generate a mapping function that maps a vector representation of an input media file to a probability that the input media file will be downloaded;

apply the mapping function generated by the supervised learning algorithm to the primary data vector for the media file to generate a probability that the media file will be downloaded; and generate a marketability score for the media file based on the probability that the media file will be downloaded;

receiving, as an output of the algorithm, a marketability score for the media file, the marketability score indicative of a likelihood that a user will download the media file; and provide the media file and media search results for display to another user, the media file ordered among the media search results based on the marketability score for the media file and marketability scores for the media search results.

\* \* \* \* \*